Figure 1:
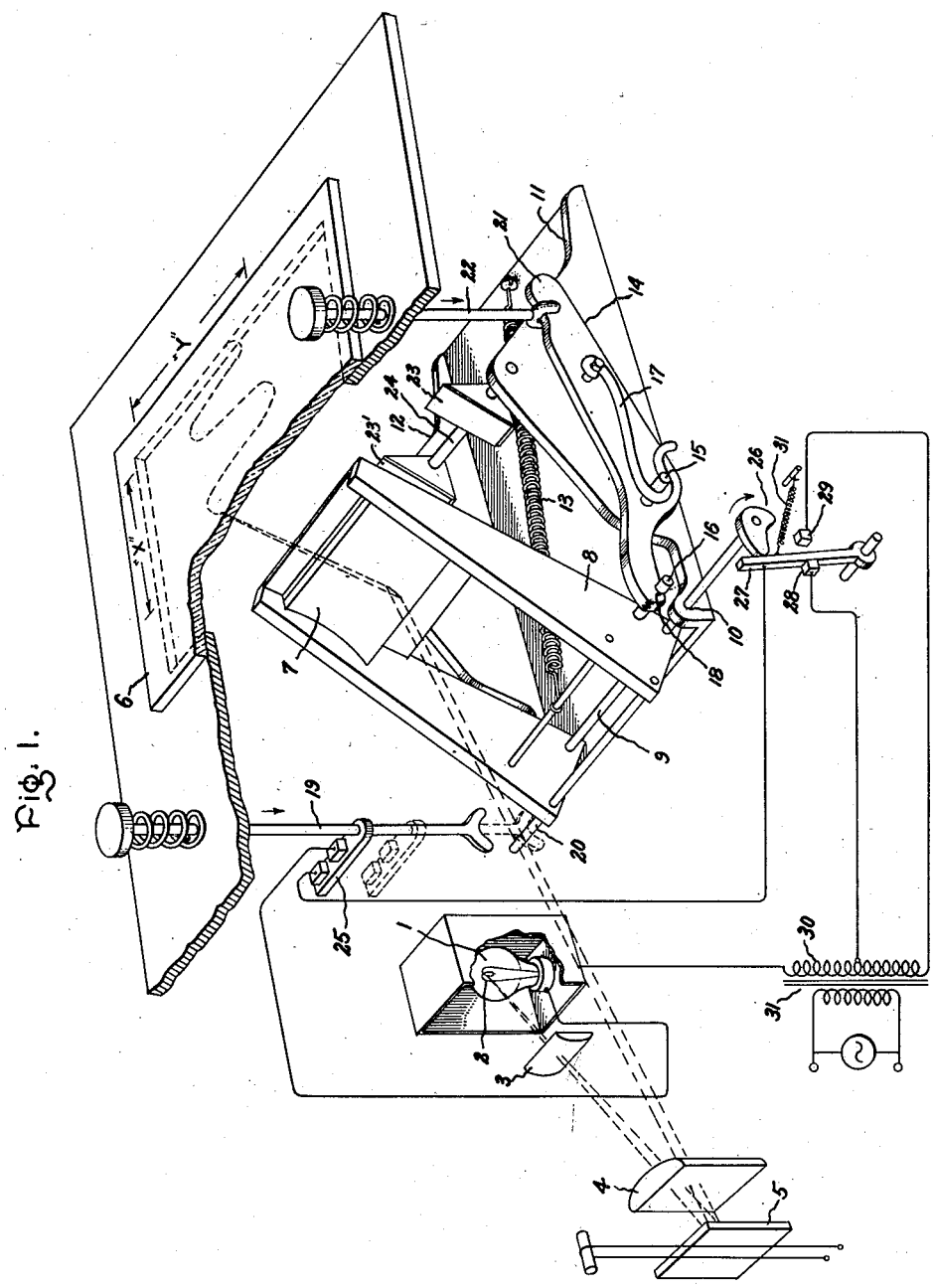

Patented Oct. 7, 1952

2,613,127

UNITED STATES PATENT OFFICE 2,613,127

OPTICAL SYSTEM FOR OSCILLOGRAPHS

Kenneth R. Geiser, Schenectady, N. Y., assignor to General Electric Company, a corporation of New York Application May 23, 1950, Serial No. 163,697

15 Claims. (Cl. 346—109)

My invention relates to oscillographs of the optical type which employ light as the recording medium and, more particularly, to optical-type oscillographs capable of providing a two dimensional portrayal of an electric function or transient occurring during a particular short interval of time. Such portrayals are commonly termed oscillograph "shots" or "shot-type" oscillograms, since only a brief sample of the electric function or transient is recorded.

In such oscillographs producing "shot-type" oscillograms, various optical systems have heretofore commonly been employed in order to produce a time base sweep of the recording light across a suitable light sensitive member, such as a film or screen. In one such system, the light sensitive member itself is physically propelled at a constant rate of speed along one axis past a recording light beam which is simultaneously deflected along a coordinate axis. However, because of the inertia of the apparatus supporting and propelling the light sensitive member as well as the necessity of eliminating extraneous light, this system does not lend itself to the production of a constant high speed time base deflection. In another optical system commonly employed, a flat mirror is arranged to receive a beam of light deflected along one axis, such as horizontal, and is rocked about its own corresponding axis to redeflect simultaneously this incident light beam along a coordinate axis and thereby to provide a time basis upon a suitably positioned recording light sensitive screen or film. However, in this latter system it is necessary to form an extremely narrow pencil-like light beam and the screen must be curved so that the distance from the light source to the screen will remain constant, regardless of the angular position of the rocking mirror in order to enable a proper focusing of the light beam upon the screen.

Accordingly, a principal object of my invention is to provide a "shot-type" oscillograph having a simple and economical optical system capable of providing a sharply delineated high speed two dimensional portrayal of an electrical function or transient upon a suitable light sensitive member such as a recording film or a viewing screen.

Another object of my invention is to provide a simple and economical optical time base deflection system for a "shot-type" oscillograph which produces an extremely linear high speed time base deflection of a beam of light.

A further object of my invention is to provide an optical system for a "shot-type" oscillograph in which the time base sweep producing member also functions as a light focusing member.

A still further object of my invention is to provide an optical system for an oscillograph capable of focusing a flood-type wide beam illumination system to produce a trace of fine delineation upon a flat light sensitive recording member or viewing screen.

A still further specific object of my invention is to provide an oscillograph optical system which produces a "shot-type" oscillogram along a plane coincident with the flat plane of the photosensitive material in the conventional "film pack."

In general, my improved oscillograph optical system comprises a line source of light which is deflected in response to the magnitude of an electric parameter along the "optical axis" of a concave surface cylindrical light reflecting and focusing member which, in turn, functions to redeflect and focus the divergent incident light as a moving spot along one axis of a suitable light sensitive recording or viewing member. The term "optical axis" as herein employed refers to the axis of this concave surface light reflecting and focusing member which is parallel to the optical plane passing through a focal line of the member and a central axis thereof.

A coordinate axis time base deflection of the recording light across this light sensitive member is produced by a coincident arcuate travel of this concave surface light reflecting and focusing member. Means are preferably included to restrain this time base producing reflecting and focusing member under suitable tension and thereby to produce a high initial velocity of this focusing member when it is released to travel through its arcuate path. An over-voltage switching system may also be provided for increasing automatically the intensity of the light source during the recording interval, and for extinguishing the light source while the concave reflecting and focusing number is being reset in preparation for another recording.

The novel features which I believe to be characteristic of my invention are set forth with particularity in the appended claims. My invention itself, however, together with further objects and advantages thereof, can best be understood by reference to the following description taken in connection with the accompanying drawing in which Fig. 1 is a perspective diagrammatic view of an optical system embodying my invention; and Fig. 2 is a schematic diagram explanatory of the operation of a portion of the optical system of Fig. 1.

Figure 2:
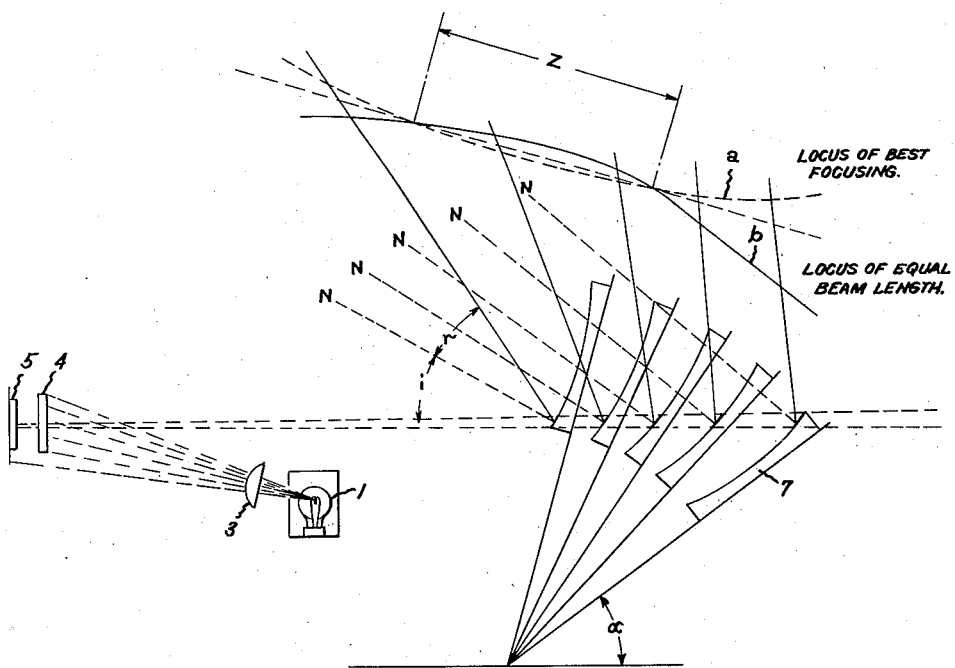

Referring to Fig. 1, I have shown my invention in one form as comprising a lamp 1, having a filament 2 constituting a line source of light which is focused by suitable optical means such as cylindrical lenses 3 and 4 upon a mirror 5 of a galvanometer (not shown). Mirror 5 is constructed and arranged in a well-known manner to oscillate about one of its axes, such as the vertical, in accordance with the magnitude of an electrical parameter supplied to the galvanometer. The incident light impinging upon the mirror 5 from the filament 2 is reflected as a linear image which is parallel to the axis of oscillation of mirror 5 and which is deflected along an orthogonal axis, such as horizontal, by the oscillation of the mirror 5. Although I have illustrated, and preferably employ, a light image producing and deflecting means, it will be appreciated that, alternatively, a ribbon light beam producing and deflecting means may be employed. Such ribbon light beam producing and deflecting systems are well known in the art and need not be described here.

In order to focus the linear image reflected from mirror 5 as a point upon a light sensitive member 6, such as a film or viewing screen, as well as to provide a means for producing a time base sweep across the screen, a segment of a cylindrical concave mirror 7 is located to receive the light reflected from mirror 5 and to redeflect this light upon the screen 6. The concave surfaced cylindrical mirror 7 is located with its optical axis substantially parallel to the direction of deflection of the vertical image reflected from the mirror 5 and at an angle of inclination with respect to this incident light such that the image is redeflected and coincidently focused to a point upon the screen 6. When the concave mirror 7 is stationary, the deflection of the image caused by mirror 5 produces a corresponding movement of the focused spot along a focal line of the mirror 7 which constitutes one axis of the screen 6, such as the Y axis designated in Fig. 1.

In order to provide a two dimensional portrayal of the deflection of this moving spot by reference to a time base sweep along a coordinate axis of the screen 6, such as the X axis designated in Fig. 1, I provide means for propelling the concave mirror 7 to travel along an arcuate path with a constantly changing angle of inclination relative to the light reflected from mirror 5. As will be more fully explained below with reference to the operation of this optical system, the instantaneous position of the concave mirror 7 during its path of travel is such that constant beam length and sharp focusing of the redeflected light upon the light sensitive member 6 is achieved throughout its movement along its arcuate path.

The concave mirror 7 is supported by a frame 8 which is pivotally mounted at its lower end by means of a swivel rod 9, firmly secured to frame 8 but free to rotate within suitable sockets 10 in a pair of upright supports 11 and 12 disposed on opposite sides of the frame 8. A high tension spring 13 is attached to the frame 8 and functions to propel the mirror 7 to describe a limited arc, with the swivel rod 9 as its axis of rotation.

In order to enable the mirror 7 to be propelled through its path of travel with a high initial velocity, a cocking lever 14 is arranged to restrain the frame 8 in an initial cocked position against the tension of spring 13. The cocking lever 14 is fulcrumed on a suitable pivot 15 secured to the upright support 11 and rides under the tension of a spring member 17 on a cocking pin 16 fastened to the frame 8. When the frame 8 is rotated toward an upright position, the cocking pin 16 slides along the under surface of the lever 14 and is engaged within a recessed shoulder 18 of the lever arm 14. Rotation of the frame 8 may, of course, be accomplished by any suitable means such as a forked cocking shaft 19 which is arranged to engage an arm 20 secured to frame 8 when the cocking shaft 19 is depressed.

The mirror frame 8 may be released from its cocked position by merely depressing on opposite end 21 of the lever arm 14 by such means as a release rod 22. Thereupon, the cocking pin 16 disengages the recessed shoulder 18 of lever arm 14 and the mirror frame 8 is propelled through its path of rotation by the force of spring 13.

In order to arrest the movement of the mirror frame 8 without excessive shock or rebound, a pair of damping platforms 23 and 23' are provided. These damping platforms 23 and 23' are journaled on a supporting rod 24 extending between the upright supports 11 and 12 respectively, and are biased by an internal spring (not shown) to an initial position inclined to the initial striking surface of the frame 8. The detailed construction of these damping platforms 23 and 23' is described and claimed in a U. S. Patent No. 2,557,720 granted June 19, 1951 to Michael Boehm and assigned to the same assignee as the present invention.

A synchronized over-voltage switching system is also provided to supply the lamp 1 with normal voltage when the mirror frame 8 is cocked immediately prior to recording, and automatically to increase the voltage supplied to the lamp 1 during the recording interval. This synchronized switching system also functions to extinguish the lamp during the cocking period so that no return trace will appear upon the light sensitive screen 6 when the mirror 7 is rotated back to its initial cocked position. Two switches are preferably employed to accomplish this synchronized switching system; one switch 25 being actuated by the movement of cocking shaft 19 and another switch 26 being actuated by the movement of swivel rod 9. Switch 25 may be a simple double terminal switch which is opened when the control cocking rod 19 is depressed, while switch 26 is preferably a three-terminal cam-operated switch in which a central contact arm 27 makes contact to either of two other terminals 28 and 29 respectively. When the mirror frame is in the cocked position illustrated in Fig. 1, the lamp 1 is energized at normal voltage through switches 26 and 25 by connection to one-half of a secondary winding 30 of a supply transformer 31. In this position, lever 27 of cam switch 26 engages terminal 28 to complete this normal voltage circuit. When the cocking lever 14 is tripped to release the mirror frame 8, the swivel rod 9 and the cam switch 26 attached thereto is rotated to enable lever 27 to engage terminal 29 under the tension of a spring 31. A circuit is thereby closed through switch 25 which supplies the entire voltage developed across the secondary winding 30 of transformer 31 to the lamp 1. When the cocking shaft 19 is depressed to recock the mirror frame 8, switch 25 is opened, disconnecting the entire series circuit supplying voltage to lamp 1, and thereby automatically extinguishing the lamp 1 during this recocking process.

The principles of construction and operation of the above-described system can best be understood by reference to the schematic diagram of Fig. 2 which illustrates a typical pattern of time base deflection of the galvanometer mirror reflected light by the swinging motion of the concave mirror 7. In Fig. 2 the cylindrical surface mirror 7 is shown in a number of discrete positions during its course of travel, and two typical curves "a" and "b" are plotted to show the locus of equal beam length points and the locus of best focusing points respectively.

The lines designated by the letter "N" are lines drawn normal to the reflecting surface of mirror 7 at each point of incidence, and the angles designated by the letters "i" and "r" represent the angle of incidence and the angle of reflectance respectively for each position of the mirror 7 relative to the incident light from the galvanometer mirror 5. There is a considerable portion of both curves, indicated by the magnitude "Z," along which both loci almost coincide, and this portion is substantially linear. It is in the plane of these coinciding loci that the light sensitive screen is located, and only this portion of the redeflected light is preferably used for recording.

Such a coincidence of the loci of beam length and focus is possible due to the production of a series of simulated ellipses by the swinging motion of the cylindrical concave mirror 7. An ellipse may be defined as the locus of points, the sum of whose distances (focal radii) from two fixed points, commonly called the foci, is constant. If an elliptical reflecting surface is employed in a suitable optical system, all light emanating from one of the foci is reflected from this elliptical surface and focused upon the other foci. Consequently, by placing the galvanometer mirror 5 at one of the foci and rotating an elliptical mirror in the path of the light reflected from the galvanometer mirror, the light redeflected by this swinging elliptical mirror has equal "sums of focal radii" or, in other words, equal beam length at every point throughout its range of travel. Moreover, the locus of best focusing coincides with the locus of equal beam length and both loci fall in a substantially straight line. If, in the interest of economy, the elliptical mirror is made cylindrical, as illustrated in Figs. 1 and 2, these two loci do not coincide over the entire range of travel but only over a portion such as indicated by the magnitude "Z." Since this area of coincidence of beam length and focal points is substantially linear, a flat screen can be used with good results.

Another important feature of my invention is that an extremely linear time base sweep can be achieved by the particular combination of optical and mechanical apparatus illustrated. The increment of time base deflection on screen 6 for a given amount of swinging angular displacement of the mirror 7 can be made to be much smaller than that which could be produced by an arcuate swinging movement of a plane surface mirror. Although the angle of inclination of the mirror itself relative to the incident light, indicated by the symbol $a$, may vary through a large angular displacement during the entire sweep of the mirror 7, the change in the actual angle of incidence "i" of the incident light relative to the curved mirror surface is comparatively small. Consequently, the time base deflection of the light spot is confined to a much smaller area on screen 6 with the result that a much greater portion of the mirror's swing may be advantageously utilized, and linearity in the rate of deflection may be more easily achieved. Although for a constant velocity of swinging angular displacement of the mirror 7, the angle of incidence "i" of the incident light to the curved mirror surface is continually increasing during the sweep, the actual increment of change in velocity of time base deflection on the screen 6 is continually decreasing. However, in the above-described optical system, the swinging angular velocity of the mirror 7 is not constant, but rather is continually accelerated under the force of spring 13 as it moves through its arcuate path. As a result, the increment of change in velocity of time base deflection tends to increase. By proper adjustment of the spring constant of spring 13, these two effects can easily be made to offset each other so that the rate of time base deflection of the light beam across the recording light sensitive screen 6 may be maintained substantially constant.

It will be appreciated that although I preferably provide means for propelling the mirror 7 through an arcuate path in a clockwise direction, the mirror may alternatively be propelled in a counterclockwise direction to produce a time base deflection across screen 6 in an opposite direction. The same optical and mechanical principles will hold true with the exception that the propelling force must work against the force of gravity instead of being aided by it.

Although I have shown a particular embodiment of my invention, many modifications can be made and will obviously occur to those skilled in the art. It is to be understood, therefore, that I intend to cover by the appended claims all such modifications as fall within the true spirit and scope of my invention.

What I claim as new and desire to secure by Letters Patent of the United States is:

1. An optical system for an oscillograph comprising a line source of light, a light sensitive member, a concave cylindrical surfaced light reflecting and focusing member located to receive light from said line source and to project and focus the light as a spot upon said light sensitive member, means for deflecting the light from said light source in a direction parallel to a focal line lying in the optical plane of said light reflecting and focusing member thereby to move the light spot projected from said light reflecting and focusing member along one axis of said light sensitive member, and means to propel said light reflecting and focusing member to travel through an arcuate path during a short interval of time, said light reflecting and focusing member intercepting the light from said light source during its travel to re-deflect the projected and focused light spot along a coordinate axis of said light sensitive member.

2. An optical system for an oscillograph comprising a line source of light, a light sensitive screen, a concave cylindrical mirror located to receive light from said line source and to reflect and focus the light as a spot upon said screen, means operative in response to an electric parameter for deflecting the light from said light source in a direction parallel to the optical axis of said mirror which lies in the optical plane thereof, thereby to move the light spot reflected from said mirror along one axis of said screen, and means to propel said mirror to travel through an arcuate path in a direction parallel to the direction of the incident light emanating from said source and at a continually changing angle of inclination with respect to said incident light, thereby to re-deflect the reflected and focused light spot along a coordinate axis of said screen.

3. An optical system for an oscillograph comprising a line source of light, a concave cylindrical mirror located to receive light from said line source and to reflect and focus the light to a focal point, means operative in response to an electric parameter for deflecting the light from said light source in a direction parallel to the optical axis of said mirror which lies in the optical plane thereof, thereby to move said focal point along a focal line of said mirror, means to propel said mirror to travel through an arcuate path in a direction parallel to the direction of the incident light emanating from said source to re-deflect said focal line in a direction perpendicular to said focal line, and a flat light sensitive screen located to coincide with a substantially linear portion of the plane through which said focal line is deflected.

4. An optical system for an oscillograph comprising a line source of light, a light sensitive screen, a concave cylindrical mirror located to receive light from said line source and to reflect and focus the light as a spot upon said screen, means for deflecting the light from said light source in a direction parallel to the optical axis of said mirror which lies in the optical plane thereof, thereby to move the light spot reflected from said mirror along one axis of said screen, and means to propel said mirror to travel through a limited arcuate path in a direction parallel to the direction of the incident light emanating from said source and at a continually increasing angle of incidence with respect to the incident light, but with a continually decreasing increment of incident angle increase, thereby to re-deflect the reflected and focused light spot along a coordinate axis of said screen, said mirror propulsion means being adapted to produce an acceleration of the velocity of said mirror during its arcuate travel to offset said decreasing increment of incident angle increase whereby the light spot is re-deflected at a substantially constant speed along said coordinate axis of said screen.

5. An optical system for an oscillograph comprising a line source of light, a light sensitive screen, a concave cylindrical mirror located to receive light from said line source and to reflect and focus the light as a spot upon said screen, means for deflecting the light from said light source in a direction parallel to the optical axis of said mirror which lies in the optical plane thereof to move the light spot reflected from said mirror along one axis of said screen, means to propel said mirror to travel through a limited arcuate path in a direction parallel to the direction of the incident light emanating from said source to re-deflect the reflected and focused light spot along a coordinate axis of said screen, cocking means to restrain said mirror against a tensional force exerted by said propulsion means, and means to release said mirror from said cocking means to enable said mirror to be propelled under the force of said propulsion means to move through said arcuate path with high initial velocity.

6. An optical system for an oscillograph comprising a line source of light, a concave cylindrical mirror located to receive light from said line source and to reflect and focus the light to a focal point, means operative in response to an electric parameter for deflecting the light from said light source in a direction parallel to the optical axis of said mirror which lies in the optical plane thereof, thereby to move said focal point along a focal line of said mirror constituting one focal axis thereof, and means to propel said mirror to travel through an arcuate path in a direction parallel to the direction of the incident light emanating from said source to re-deflect said focal line along a locus of points having substantially equal sums of focal radii and constituting a coordinate focal axis of said mirror, and means for supporting a flat light sensitive screen in the focal plane of a substantially linear portion of said coordinate focal axis.

7. An optical system for as oscillograph comprising a line source of light, a plane surface mirror adapted to be moved in response to the magnitude of an electric parameter and located to intercept and deflect the light from said line source along a predetermined axis, a light sensitive screen, a concave surfaced cylindrical mirror oriented with its optical axis substantially parallel to said axis of deflection and located to intercept the light reflected from said plane surface mirror at a predetermined angle of incidence with respect thereto and to re-reflect and focus the incident light from said plane mirror at any instant throughout its range of deflection as a light spot at a corresponding point along one axis of said screen, and means to propel the concave mirror to travel along an arcuate path intercepting the plane surfaced mirror reflected light with a continually changing angle of inclination, thereby to re-deflect the light spot along a coordinate axis of said screen while maintaining the focusing thereof.

8. An optical system for an oscillograph comprising a line source of light, a plane surface mirror adapted to be moved in response to the magnitude of an electric parameter and located to intercept and deflect the image of said light source along a predetermined axis, a concave cylindrical mirror oriented with its optical axis substantially parallel to said axis of deflection and located to project and focus the incident light from said plane mirror as a light spot moving along a focal axis of said concave mirror in accordance with said plane mirror deflections of said light image, means to propel said concave mirror to travel along an arcuate path in a direction parallel to and intercepting said plane surfaced mirror reflected light simultaneously to re-deflect said light spot along a coordinate focal axis relative to said one focal axis, and light sensitive means located in the plane of both said focal axes to receive a delineation of said moving light spot.

9. An optical system for an oscillograph comprising a line source of light, a plane surfaced mirror adapted to be moved in response to the magnitude of an electric parameter and located to intercept and deflect the light from said line source along a predetermined axis, a concave cylindrical mirror oriented with the optical axis which lies in its optical plane substantially parallel to said axis of deflection and located to project and focus the incident light from said plane mirror as a spot deflected along the focal line of said concave mirror, means to propel said concave mirror to travel along an arcuate path intercepting and in a direction parallel to said plane surfaced mirror reflected light to move said focal line through a locus of points constituting a coordinate axis of deflection, a series of said locus of points having equal sums of focal radii and lying within a substantially flat plane, and means for supporting a light sensitive screen in said flat plane portion of said coordinate axis of deflection.

10. An optical system for an oscillograph comprising a line source of light, a plane surface mirror adapted to be moved in response to an electric parameter and located to intercept and deflect the light from said line source along a predetermined axis, a light sensitive screen, a concave cylindrical surface mirror oriented with its optical axis substantially parallel to said axis of deflection and located to re-reflect and focus incident light received from said plane surfaced mirror as a spot along one axis of said screen, and means to propel said concave mirror to travel through a limited arcuate path in a direction parallel to said incident light to re-deflect said light spot along a coordinate axis of said screen, said concave mirror intercepting said incident light during its arcuate travel with a continually increasing angle of incidence but with a continually decreasing increment of incident angle increase for a constant angular velocity of said mirror, said mirror propulsion means being adapted to accelerate the velocity of said mirror during its arcuate travel to offset said decreasing increment of incident angle increase, and thereby to re-deflect the light spot at a substantially constant velocity along said coordinate axis of said screen.

11. An optical time base deflection system for an oscillograph comprising a line source of light, a light sensitive member, a concave cylindrical surfaced light reflecting and focusing member located to receive light from said line source and to project and focus the light as a spot upon said light sensitive member, and means to propel said light reflecting and focusing member to travel through an arcuate path in a direction parallel to the direction of the incident light from said light source to deflect said light spot along a time base axis of said light sensitive member.

12. An optical time base deflection system for an oscillograph comprising a line source of light, a concave cylindrical mirror located to receive light from said line source and to focus the light to a focal point, means to propel said mirror to travel through an arcuate path in a direction parallel to the direction of incident light from said light source to deflect said focal point along a locus of points constituting an axis of deflection, and means for supporting a light sensitive member in the plane of said axis of deflection.

13. An optical time base deflection system for an oscillograph comprising a line source of light, a light sensitive screen, a concave cylindrical mirror located to receive light from said source and to reflect and focus the light as a spot upon said screen, and means to propel said mirror to travel through a limited arcuate path in a direction parallel to the direction of incident light from said source to deflect the light spot along a time base axis of said screen, said mirror intercepting the incident light during its arcuate travel with a continually increasing angle of incidence but with a continually decreasing increment of incident angle increase, and said mirror propulsion means being constructed to accelerate the velocity of said mirror during its arcuate travel to compensate for said decreasing increment of incident angle increase, thereby to provide a substantially linear time base deflection of said light spot along said screen.

14. An optical time base deflection system for an oscillograph comprising a source of light, a light sensitive screen, a mirror located to receive light from said light source and to reflect the light upon said screen, means to propel said mirror to travel through a limited arcuate path in a direction parallel to the direction of incident light from said light source to deflect the light along a time base axis of said screen, cocking means to restrain said mirror against a tensional force exerted by said propulsion means, and means to release said mirror from said cocking means to enable said mirror to be propelled under the force of said propulsion means to move through said arcuate path with high initial velocity.

15. An optical time base deflection system for an oscillograph comprising a source of light, a light sensitive screen, a mirror located to receive light from said light source and to reflect the light upon said screen, means to propel said mirror to travel through a limited arcuate path in a direction parallel to the direction of incident light from said light source to deflect the light along a time base axis of said screen, cocking means to restrain said mirror against a tensional force exerted by said propulsion means, means to release said mirror from said cocking means, and overvoltage supplying means connected to said light source and energized by the release of said mirror from said cocking means to increase the voltage supplied to said light source during the period of said arcuate travel of said mirror.

KENNETH R. GEISER.

REFERENCES CITED

The following references are of record in the file of this patent:

UNITED STATES PATENTS

| Number | Name | Date |
| --- | --- | --- |
| 1,913,200 | Hathaway | June 6, 1933 |
| 2,269,674 | Liddel et al. | Jan. 13, 1942 |

FOREIGN PATENTS

| Number | Country | Date |
| --- | --- | --- |
| 259 | Great Britain | of 1912 |